United States Patent [19]

Van Der Walt

[11] Patent Number: 5,119,234

[45] Date of Patent: Jun. 2, 1992

[54] CAMERA FOR STEREOSCOPIC IMAGES

[76] Inventor: Petrus J. Van Der Walt, Natal Brickfields, Madadeni Township, Natal, South Africa

[21] Appl. No.: 555,662

[22] Filed: Oct. 16, 1990

[51] Int. Cl.[5] .................. G02B 27/22; G03B 35/08; G03B 35.18

[52] U.S. Cl. .................. 359/472; 352/57; 352/58; 352/60

[58] Field of Search .................. 350/130, 137, 138; 359/466, 467, 468, 469, 471, 472; 352/57, 58, 60

[56] References Cited

U.S. PATENT DOCUMENTS

| | | | |
|---|---|---|---|
| 2,834,270 | 5/1958 | Williams | 350/138 |
| 3,825,328 | 7/1974 | Hoch | 350/137 X |
| 3,891,303 | 6/1975 | Barquero | 350/132 |
| 4,464,015 | 8/1984 | Shafer | 350/138 |

FOREIGN PATENT DOCUMENTS

| | | | |
|---|---|---|---|
| 2106596 | 10/1972 | Fed. Rep. of Germany | 350/138 |
| 3634485 | 4/1988 | Fed. Rep. of Germany | |
| 2609181 | 7/1988 | France | |
| 308024 | 9/1955 | Switzerland | |

Primary Examiner—Scott J. Sugarman
Attorney, Agent, or Firm—Fleit, Jacobson, Cohn, Price, Holman & Stern

[57] ABSTRACT

A method and apparatus for the provision of stereoscopic three-dimensional images applicable in visual representations such as photographs, paintings, pictures and other patterns or diagrams on a surface which could be produced by other means; to kinematic images which might, for example, be employed in a cinema; to projected still images; to advertisements in these mediums; to book illustrations and decorations such, for example, as murals, and upholstered curtains. This invention provides a swopping over or reversal of positions of two stereoscopic images as compared to the presentation of stereoscopic images which has been heretofore employed. This presentation permits a viewer to see a three-dimensional image without any optical aids being necessary, merely by "squinting" the eyes slightly.

3 Claims, 5 Drawing Sheets

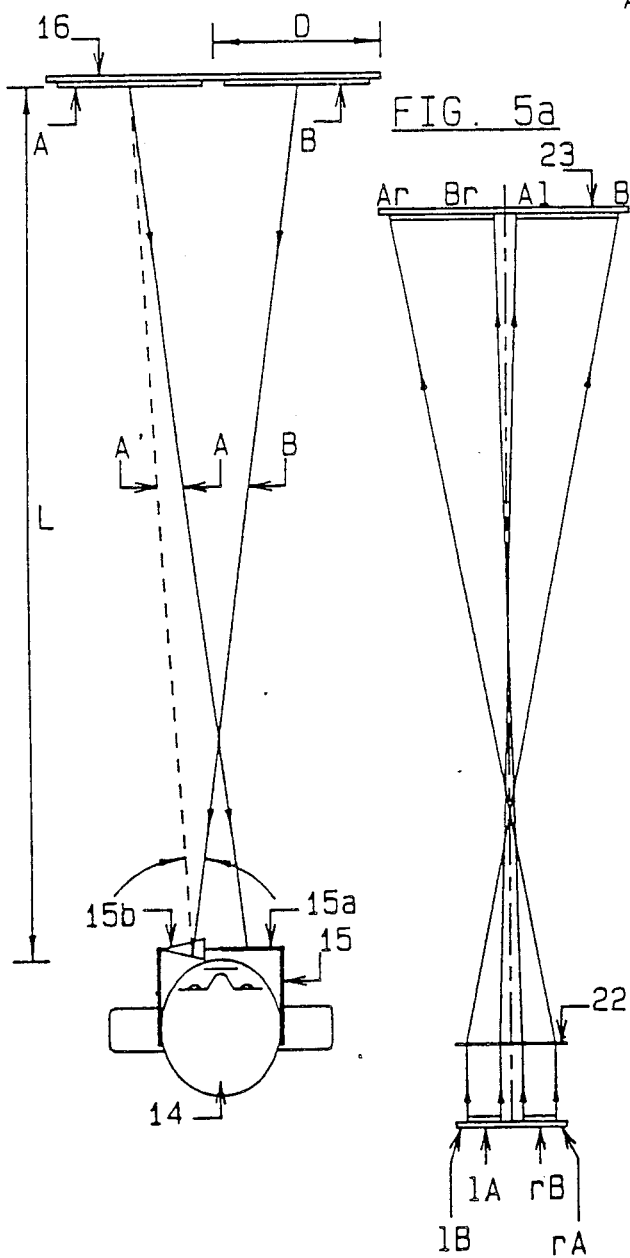
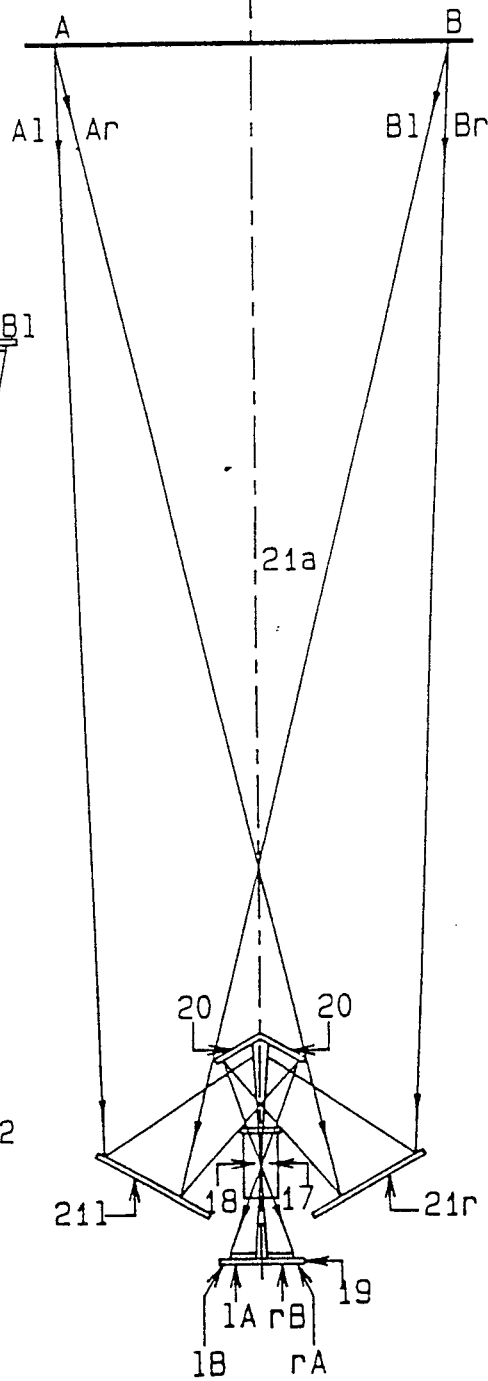

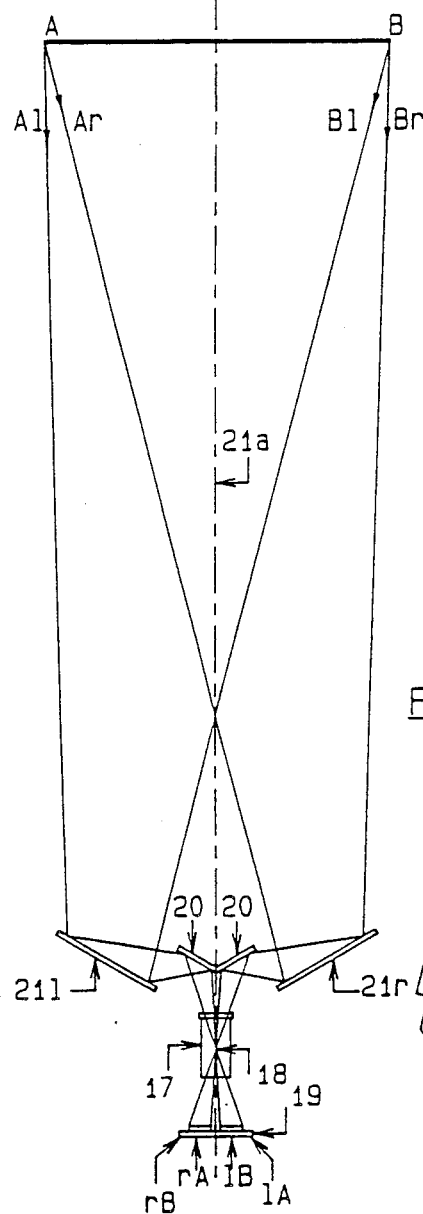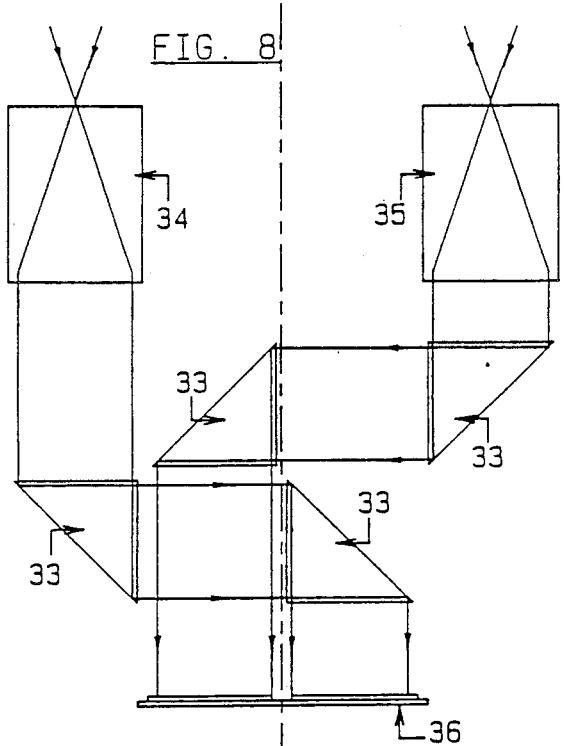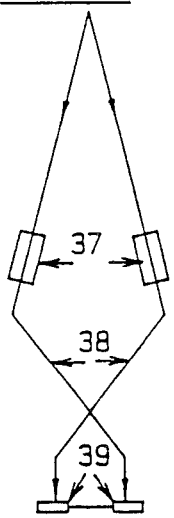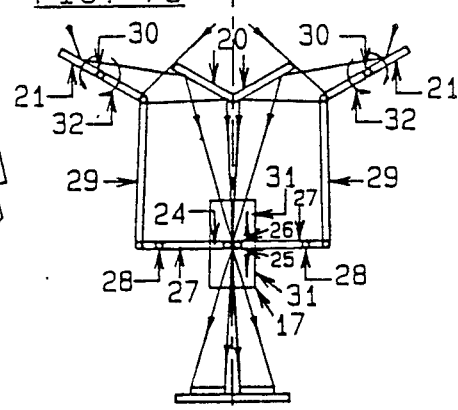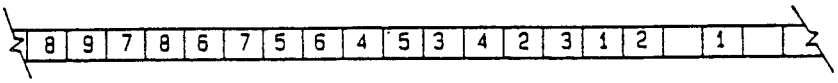

CAMERA FOR STEREOSCOPIC IMAGES

BACKGROUND OF THE INVENTION

1. Field of the Invention

This invention relates to a method and apparatus for the provision of stereoscopic images, applicable in a wide field of different visual media. For example, this invention may be applied to visual representations such as photographs, paintings, pictures and other patterns or diagrams on a surface which could be produced by other means; to kinematic images which might, for example, be employed in a cinema; to projected still images; to advertisements in these mediums; to book illustrations and decorations, such, for example, as murals, and upholstered curtains. This invention may be applied in any other provision of images on any surface which may be observed by a person, including television or video, e.g. for teaching.

2. DESCRIPTION OF PRIOR RELATED ART

This invention provides a swopping over or reversal of positions of two stereoscopic images as compared to the presentation of stereoscopic images which has been heretofore employed. The principles of the old methods of presentation of stereoscopic images have been described, for example, in the February 1965 edition of "Scientific American" Magazine, pages 42 to 48.

SUMMARY OF THE INVENTION

A method in accordance with this invention includes the providing of two images alongside each other of a scene as appearing from two different directions, in which the image appearing from the left hand direction of the two directions is provided on the right and the image appearing from the right hand direction is provided on the left of the two images alongside each other.

The method in accordance with the preferred embodiment of this invention may furthermore include the photographic recording of the two images onto a photographic film from which they may be projected onto a screen in accordance with this invention. Preferably the crossing over of positions of the two images is carried out during the photographic recording and preferably before the images are implanted onto the films. The method of this invention thus includes the production of images, for example, both for stills projection and for kinematic projection, as well as the projection of stereoscopic images printed onto suitable surfaces, e.g. books, cards, posters, fabrics, hangings, etc. for direct observing. It has also been known to generate stereoscopic images using a computer and this method may also be used in the present invention.

This invention further provides apparatus for performing or carrying out the method of the invention. In accordance with one preferred embodiment of this invention the apparatus comprises a camera having two image-receiving optical paths which are spaced apart and adapted to receive images from different directions which converge on the positions of scenes which are to be recorded, adapted to suitably focus the two stereoscopic images on the film. Preferably, the apparatus includes means to cross over the positions of the images before they are implanted on a photographic film. The stereoscopic images may then be projected onto a suitable screen directly, being already crossed over. In an alternative embodiment the crossing over is carried out in the projector apparatus and not in the camera.

The two optical paths can be fixed in their optical settings so as to provide suitable focus over a given depth of field which may be practical for general purposes and so as to have mutual directions which converge to a position a suitable distance away. It is preferable, however, for the directions to be variable so that they may be adjusted to converge on scenes located at variable distances away. Preferably the distance focussing of the optical paths is correlated with the directions so that the optical paths focus the image at a distance at which the two directions converge, thus simulating normal vision of a person. Thus preferably the two optical Paths in the apparatus are spaced apart by a distance which is of the same order of magnitude as the average distance between a person's eyes. The impression of animal's vision such as a lion may be given by taking images of a scene (e.g. a lion's prey) with a spacing corresponding to the lion's eyes. It is also possible to have stars vision by having observing points (co-ordinated) between 2 satellites on opposite extremities of the earth and all in between.

The optical paths referred to, can, for example, comprise two separated lens systems adapted to collect the images and focus them on the film. A single film can be used in which each image occupies half of the frame width or two separated films could be used. In accordance with an alternative embodiment a single film is used which is traversed so that the two stereoscopic images can suitably occupy successive frames in the film.

Apparatus in accordance with an alternative embodiment of this invention, however, uses suitable reflecting systems reflecting two stereoscopic images into a single lens system.

The crossing over of the relative positions of the two images in accordance with this invention must not be confused with the normal left-to-right reversal of a single image in a mirror image effect which occurs in a lens system of a camera since this reversal is normally cancelled out by a similar reversal which occurs during projection. In accordance with this invention the two projected images are crossed over from left to right (but not from top to bottom), and each image is not reversed when presented for viewing. An advantage of the use of reflecting systems is that they may be provided as an accessory which could be mounted on a conventional camera or projector in suitable cases.

A further possibility for implementing the invention is to provide the two images one superimposed on the same field as the other but broken into a raster in which even squares show the left-eye image and odd squares the right-eye image. This imaging will require an aid for viewing to distinguish the image for left eye from that for right eye but requiring only a slight squint by the viewer. Such image distinguishing could, for example, be done by applying a different colour caste to each image and providing viewing spectacles with left and right lenses having corresponding colour castes.

BRIEF DESCRIPTION OF THE DRAWINGS

This invention will be more fully described with reference to the accompanying drawings in which preferred embodiments thereof are illustrated by way of example. This invention is not, however, limited to the examples described with reference to the drawings in which:

FIG. 4 is a schematic representation in plan view showing a person using special spectacles for the achieving of three dimensional vision of stereoscopic images in accordance with this invention, FIG. 5 is a schematic illustration in plan view of a photographic camera having mirrors for stereoscopic photography.

FIG. 5a represents projection of the images recorded by the camera of FIG. 5,

FIG. 7 shows schematically a photographic camera for exposing stereoscopic images in accordance with one embodiment of this invention, FIG. 7a shows an apparatus in accordance with a preferred embodiment of this invention, FIG. 8 illustrates schematically a photographic camera for producing stereoscopic images in accordance with another preferred embodiment of this invention.

FIG. 9 is an illustration of a photographic film exposed by an apparatus in accordance with yet another preferred embodiment of this invention. This arrangement is ideally suited to provide moving pictures to an individual viewer. The 3-D effect will very nearly perfect. This will find great demand for amusement parks, cafe's and other public places on the coin machine idea.

DESCRIPTION OF THE PREFERRED EMBODIMENTS

Figure 1:
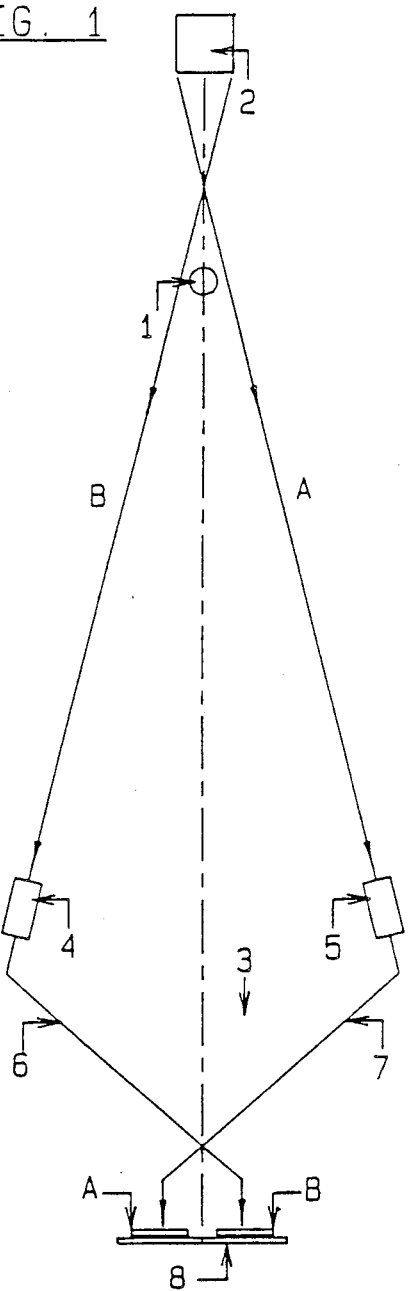
FIG. 1 is a schematic representation in plan view of a visual scene and apparatus for stereoscopic recording thereof in accordance with this invention.
Figure 2A:
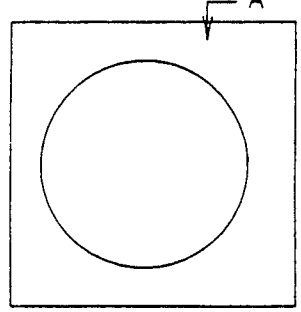
FIG. 2a is a representation of other descriptive images recorded by the methods and apparatus of the invention.
Figure 2B:
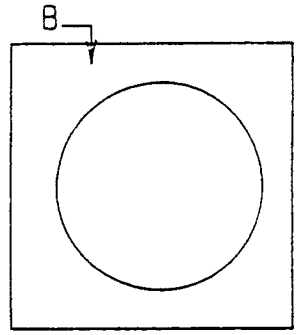
FIG. 2 is a representation of stereoscopic images recorded by the methods and apparatus of this invention.
Figure 3:
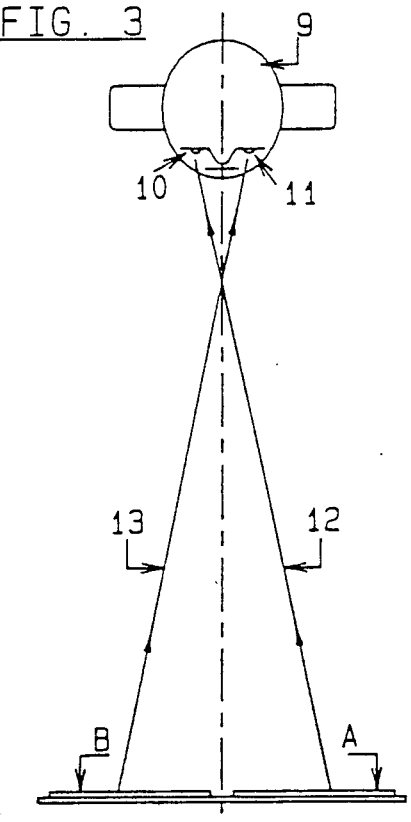
FIG. 3 is a schematic representation in plan view of a person looking at stereoscopic images in accordance with this invention without the aid of spectacles and in a manner enabling three dimensional vision to be achieved.
Figure 2A:
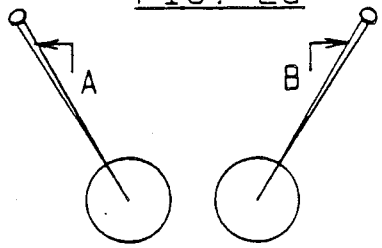

Reference may be had to FIGS. 1, 2 and 3 with reference to which a general description of the principle of this invention will be given. As shown in FIG. 1 a scene comprises in this example two objects which are sphere 1 and cube 2 located at different distances away from a camera 3 in accordance with this invention, but both on a straight line extending directly in front of the camera. The camera 3 comprises two stereoscopic lenses 4 and 5 which are angled and focussed so as to simultaneously photograph the scene comprising 1 and 2. Suitable optical paths are provided by known optical apparatus and are indicated here schematically by lines 6 and 7, respectively, and it will be seen that these optical paths 6 and 7 cross so as to provide images on a photographic film 8. Thus the image from the right hand view A passing through lens 5 and optical part 7 is crossed over to the left hand side A of the photographic film 8.

FIG. 2 shows approximately the images A and B as they occur on the photographic film 8 whence it will be seen that the image A as appearing from the right is located on the left hand side and image B as appearing from the left is located on the right hand side. These two images may be photographically printed onto a photographic print or they could be projected onto a screen as shown. FIG. 2a is another example of stereoscopic images A and B in accordance with this invention.

As shown in FIG. 3 the images A and B however, reproduced may be viewed by a person 9. The person 9 has to be taught or trained to look at images A and B in a particular way. This is that he must squint his eyes inwards so that the right-hand eye 10 focuses on the image A and the left hand eye 11 focuses on the image B resulting in a stere-optic retinal impression which is fused by the brain into a three dimensional image, corresponding with that photographed. It will be found that when the eyes are squinted as indicated by the path lines 12 and 13, respectively, three images are obtained namely a left hand image A, a central image which is a fused image of A and B and a right hand image B. The central fused image, however, will usually at first be quite blurred but with practice and concentration the person 9 will find that he can focus on the fused image so that it becomes clear and then the three dimensional effect is obtained. This invention is, however, not limited to the achievement of the three dimensional effect in any given person or persons but only to the production of the stereoscopic images A and B since the achievement of the three dimensional effect is a psychological effect achieved by the individual and whereas the majority of people will probably succeed, there may be some people who will not. This can be tried out on the illustrations of FIGS. 2 and 2a.

Figure 10:
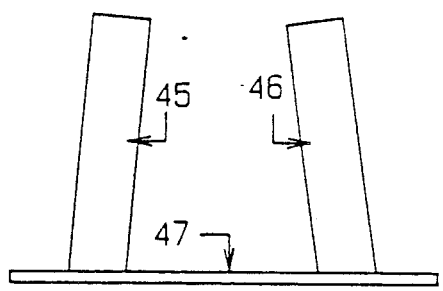
FIGS. 10 and 11 are a plan and elevation of a binocular device to assist or train correct vision for observing the 3-D effect.
Figure 11:
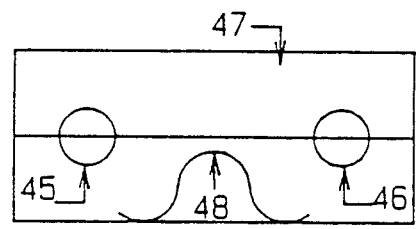

A further device shown in FIGS. 10 and 11 which is two paper tubes 1" in diameter ×4" long held in such a position when looked through the left eye sees the right picture and the right eye the left picture. By squinting the single 3-D picture appears.

Another method is a card with two rectangular slots cut in such a position that when held at the top of the nose and looked through at the two pictures, results in only the 3-D picture appearing when eyes are squinted.

As shown in FIG. 4 the stereoscopic images A and B may be viewed by a person 14 using specially adapted spectacles 15. Spectacles 15, for example, comprise a plain parallel lens 15a and a prismatical lens 15b with the broad part of the prism (a variable prism has been developed by the inventor) near the observers nose. The prism 15b bends the light rays B from the image B so that the observer 14 sees a virtual image of B in the direction of the broken line A' which visual image fuses stereoscopically with the image A as indicated by the ray A and these combine in the observers brain through stereo-optic psychological process into a three dimensional image. The angle of divergence of the prism 15b must be suitably chosen in proportion to the distance between the images D and the length of the observer 14 from the screen or print 16. For this purpose adjustable spectacles would be desirable where they are intended to be used, for example, in a theatre or other situations where the observer may be seated at a variable distance from the screen 16. Such adjustment could, for example, be achieved by a suitable arrangement to adjust the angle of the prism 15b to the incident ray B. Other suitable optical apparatus will be obvious to those skilled in the art. Furthermore the principles of the stereoscopic process are well-known to those skilled in the art and will be applied to the working of this invention. One could use two-prism spectacles. With use of suitable viewing apparatus the two images could even be provided spaced apart a large distance or on two separate surfaces, e.g. inclined to each other or facing opposite each other.

Figure 12:
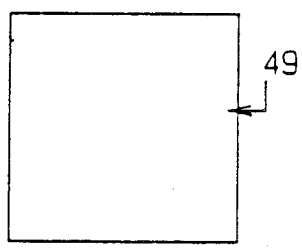
FIGS. 12 and 13 show a variable angle prism.
Figure 13:
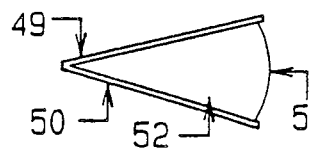

FIGS. 12 and 13 show variable or adjustable prism which can be achieved by means of a fluid such as water imprisoned between two disks or plates of plastic or glass, one side being hinged and the other two ends and sides moveable to vary the angle of the prism, the ends and sides being closed to completely seal in the water by means of flexible membranes that form a flexible bag allowing the opening and closing of the discs or plates. This provides an adjustable prism to assist the 3-D type vision for those who have difficulty with it.

Figure 14:
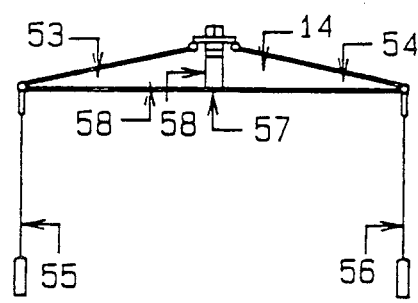
FIG. 14 shows spectacles in plan having variable prisms.

FIG. 14 shows the use of two such prisms in a pair of spectacles with the central adjusting mechanism at the nose bridge portion of the spectacles which has not been shown in detail but which could be manually adjustable or electronically or otherwise adjustable as required.

These kinds of prisms can also be used for video and other types of cameras which must be modified in accordance with this design.

As shown in FIG. 5 a photographic camera either still or kinematic may be provided in accordance with this invention in which the images implanted on the photographic material are swopped in position from left to right and right to left respectively. Such a camera as in this example may comprise a single lens system 17 having a focal point 18, a photographic film 19 and a system of mirrors comprising mirrors 20 and mirrors 21.

The mirrors 20 are symmetrical about the optical axis 21a of the camera. The lens system 17 is adjustable in the usual way for focusing to any desired distance, and will of course as usual have a suitable depth of field. The mirrors 21 are adjustable in respect of their angles so as to direct the light rays into the camera when they are emanating from directions corresponding to a scene located at a distance at which the lens system 17 is focused. Thus as the lens system 17 varies focus of the mirrors 21 must be varied correspondingly. Thus in the example a scene is schematically depicted by line AB and the lens system 17 focused on to that distance. The mirrors 21 are angled so that they receive light rays from the scene AB. Thus light rays $A_R$ and $B_R$ are reflected by mirror 21R onto the right hand half of mirrors 20 through the lens system 17 and onto the photographic film 19 in the positions indicated by $A_R$ and $B_R$ reversed. Similarly the light rays $A_L$ and $B_L$ emanating from the scene AB are reflected by mirror 21L onto the left hand half of mirrors 20 through the lens system 17 into the reversed positions AL and BL on the photographic film 19. Whenever an optical lens system having a focal point is used, it must be remembered that a crossing over from left to right and from top to bottom of the images projected onto the photographic film occurs in all cases. Thus in this example the images projected onto the photographic film although swopped over by the mirrors 20 and 21 are again swopped over by the lens system.

However, as shown in FIG. 5A when the images on the photographic film 19 are projected by a suitable projector having a lens system as schematically indicated by 22 the image is again reversed and is projected onto a screen 23 with a direct reversal of the stereoscopic images. Thus the image $A_R B_R$ as appearing from the right hand direction is on the left, and the image $A_L B_L$ as appearing from the left hand direction is on the right. The image projected onto the screen 23 could, for example, be an image projected as in the case of cinemas or slide projection, or it could be an image projected onto a photo-sensitised paper for printing to make a print. Thus the reversal in accordance with this invention from left-hand to right-hand must not be confused with the reversal which usually occurs in optical apparatus for photographic purposes by the lens system which is already well-known.

Figure 6:
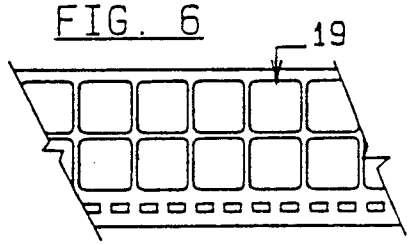
FIG. 6 illustrates photographic film exposed by the apparatus illustrated in FIG. 5.

As shown in FIG. 6 the left-hand and right-hand images may be provided side by side on a photographic film 19.

As shown in FIG. 7 a photographic camera in accordance with the alternative embodiment for carrying out this invention is provided with a mirror system which does not cause a reversal of the images onto the photographic film 19. Similar parts are indicated by similar reference numerals. A quick perusal of the drawing will show the fact that the images are not reversed as in the case of illustration in FIG. 5 in accordance with this invention, although they are reversed by the lens system of the camera. In order to provide stereoscopic images from the photographic film 19 illustrated in FIG. 7 in accordance with this invention the images must be crossed by the projecting apparatus. Thus in such a case the invention will primarily be carried out by the apparatus of the projector and the crossing over of images will not be carried out by the camera recording the scene.

FIG. 7A illustrates schematically an arrangement for providing the simultaneous adjustment of the angle of the mirrors 21 as the lens system 17 is adjusted to focus on varying distance. A ring 24 in which the movable lens is located is provided with a circumferential groove 25.

A lug 26 runs in the groove 25 and is fixed to a pivot link 27 pivoted to 28. Pivot link 27 is hingedly connected to a link 29 which is similarly hingedly connected to a mirror 21 which itself is pivotally mounted by pivot 30. This arrangement is provided symmetrically for both mirrors 21. First the ring 24 is rotated on a screw in order to adjust the focus by moving axially in the direction indicated by arrows 31. This movement is connected by means of the links described to rotate the mirrors 21 in the directions indicated by arrows 32. Suitable choice of dimensions of the links will provide suitable correlation in movements.

As shown in FIG. 8 a system of reflecting prisms 33 can alternatively be used in combination with two lens systems 34 and 35. The lens systems 34 and 35 are adapted to be focusable on differing distances and also to be angled in correlation to the distance focussed to in the same way as previously described. The reflecting prisms 33 reverse the images and implant them onto the photographic material 36.

As shown in FIG. 9 the photographic images may be implanted on the film not side by side but consecutively and in this event advantage may be achieved by arranging the images as shown in FIG. 9 where the numerals written into each frame indicate the sequence of the images from the two directions. In FIG. 9 the apparatus providing the images is also schematically indicated in which 37 are lens systems crossing optical paths 38 and suitable shutter mechanisms 39. The apparatus comprises a camera having two image-receiving optical paths which are spaced apart and adapted to receive images from different directions which converge on the positions of scenes which are to be recorded, adapted to suitably focus the two stereoscopic images on the film in which the apparatus includes means to cross over the positions of the images before they are implanted on a photographic film. It may be noted that an advantage of the embodiments illustrated in FIGS. 5 and 7 may be that conventional cameras may be adapted by suitable adaptors comprising the mirror system as illustrated. Various modifications to the optical systems illustrated may be obvious to those skilled in the art as well as various alternative apparatuses and means for carrying out this invention. The film shown in FIG. 9 should advantageously be provided with marks to facilitate suitable splicing.

FIG. 10 shows a binocular device comprising two tubes 45 and 46 mounted on a card 47 which has an indent for the nose at 48, this seen in the view of FIG. 11 to which reference is also made. At the card 47 the tubes are a suitable distance apart to match the eyes of a person and they "tunnel" the vision to direct the eyes on to left hand and right hand reversed images of the scene which are suitable to give a stereoscopic impression. These tubes thus assist or train the eyes of a person who has difficulty in "squinting" naturally.

FIGS. 12 and 13 show a variable angle prism comprising a top plate 49, bottom plate 50 of a clear material joined together by the walls of a bag 51 which contains a liquid 52 which is clear and has selected optical properties. The bag allows the plates to be opened or closed in their relative angle in order to adjust the prism angle.

FIG. 14 shows two such variable angle prisms 53 and 54 mounted in a spectacles frame as seen above, the ear pieces 55 and 56 allowing it to be worn as ordinary spectacles and with a nose bridge at 57. An adjusting mechanism 58 at the nose bridge is provided in order to allow simultaneous equal adjustment of the angles of the prisms.

Further development may make useful techniques in which the two visions are in fact superimposed, for example, using polarized light which will require the use of polarized spectacles. Television cameras must be developed to provide two VCR tubes providing the two images required. Cameras can be developed using a vibrating mirror which will provide the successive images on film or in video recording.

Figure 15:
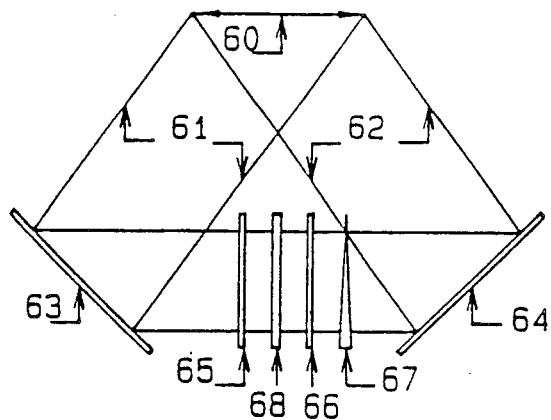
FIG. 15 is a schematic illustration of a camera for producing images of a scene in accordance with the invention on a raster on a single field, using a double coated film.
Figure 16:
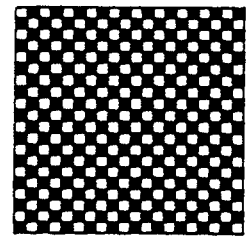
FIG. 16 shows such a single field raster image.

FIG. 15 shows the three dimensional object 60 is viewed from two directions 61 and 62 onto mirrors 63 and 64, respectively, which reflect the images inwardly to two square holed grids 65 and 66, respectively, to establish a raster for each image, a prism 67 being interposed in one of the reflection paths so as to offset the raster of that image by one raster row and column. The two grids are so adjusted that the unexposed squares or holes on one side will be exposed on the other side thus avoiding overlapping of the same area. These rastered images are projected onto transparent film 68 coated with photographic emulsion on both sides. Unexposed emulsion becomes clear so that looking or Projecting light through the both emulsions the effect is as indicated in FIG. 16 where the dark squares indicate the one image and the light squares the other image. e.g. of directions 61 and 62, respectively. The prism can be adjusted to deflect light to the next hole thus shifting the whole scene downwards, sideways or downwards-and-sideways one or more stages. This technique may be further developed for photography, still, roll film, television or video technologies by which the solution for a single screen projection may be provided.

Figure 17:
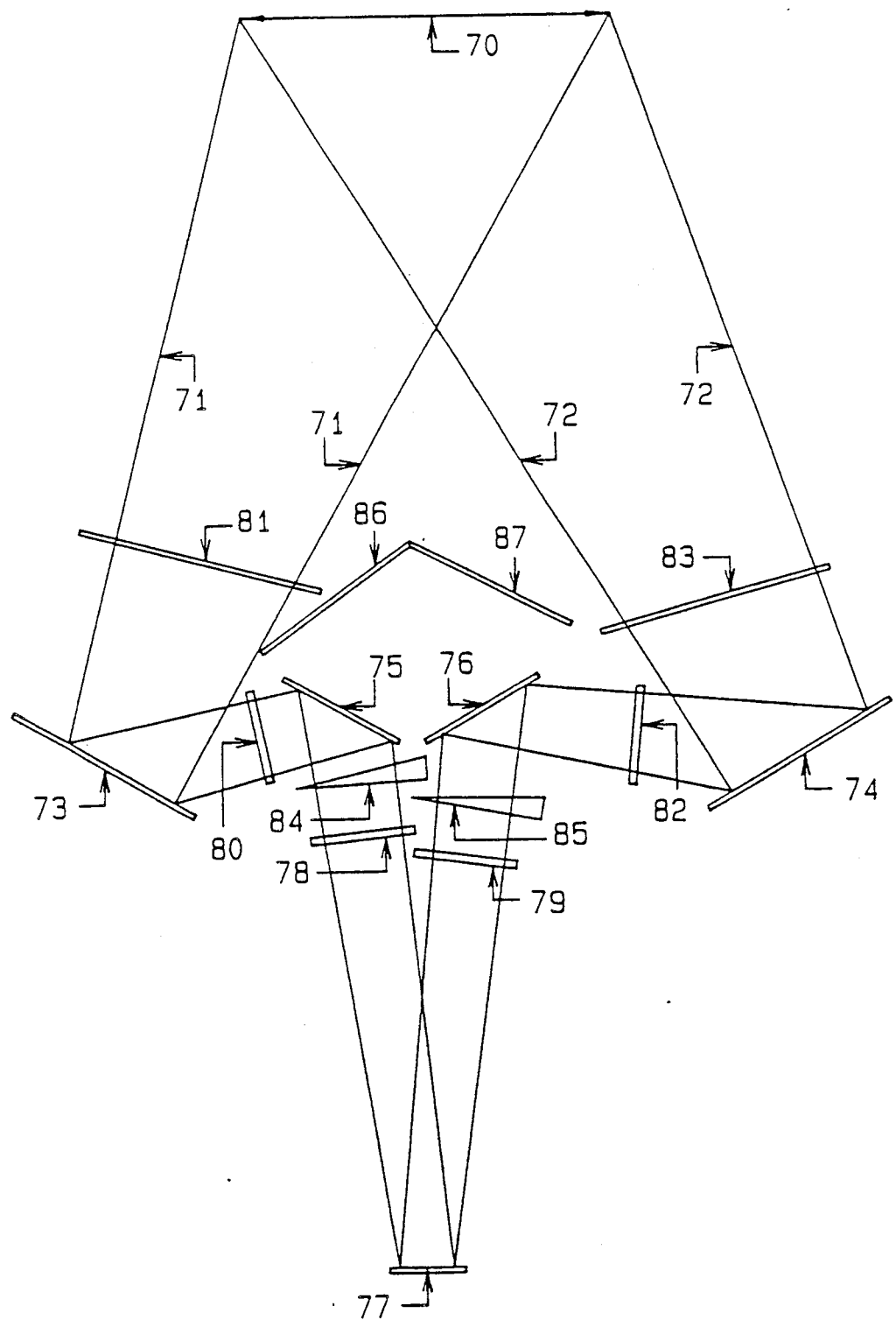
FIG. 17 is a schematic illustration of a camera for producing a similar image to FIG. 16, using a single coated film.

FIG. 17 shows the schematic arrangement for a camera to achieve the same effect as has been described with respect to FIGS. 15 and 16 but allowing an ordinary one-side emulsion coated film, applicable to still photography, roll film (motion) photograph video and television.

The scene 70 is detected in two views in directions 71 and 72, reflected inwardly by mirrors 73 and 74, respectively, thence via mirrors 75 and 76 to the single-side-emulsion coated film 77 with grids 78 and 79 interposed in the paths. Alternative positions for the grids are shown at 80, 81, 82 and 83. A prism or prisms 84 and/or 85 may be provided. Alternative positions for mirrors 75 and 76 are shown at 86 and 87. Fibre optics can also be used. Left and right eye images can be displaced vertically and/or horizontally one from the other on the raster. Viewing will require slight squinting to allow a three-dimensional interpretation by the mind from the one from picture, hopefully without optical aids, such as tone cast spectacles, polarized light or the like.

I claim:
1. A camera having two image-receiving optical paths: a) which are spaced apart and adapted to receive stereoscopic images from different directions which converge on a scene or three-dimensional object which is to be recorded, b) which are suitably adapted to focus the respective stereoscopic images on photographic film, and c) which have two grids adapted and adjusted to form mutually non-overlapping rasters of the respective stereoscopic images onto a single field of said film, the camera further having means to cross over respective positions of the images before they are implanted on the film, and the cross-over of said images being of at least one raster column in width.

2. A camera as claimed in claim 1 in which the three-dimensional object is viewed from two directions onto mirrors which reflect respective images inwardly to two square-holed grids to establish a raster for each image, a prism being interposed in one reflection path to offset the raster of that image by one raster row and column, and wherein the respective images are projected onto opposite sides of a film having emulsion on both sides.

3. A camera as claimed in claim 1 which has two sets of mirrors to reflect two views of the scene from the respective different directions onto a single side of a single-side-emulsion coated film.

* * * * *